United States Patent [19]

Otto

[11] Patent Number: 5,563,234

[45] Date of Patent: Oct. 8, 1996

[54] CARRIER PLATE FOR A LAMINATION PROCESS

[75] Inventor: David C. Otto, Kennett Square, Pa.

[73] Assignee: E. I. Du Pont de Nemours and Company, Wilmington, Del.

[21] Appl. No.: 110,272

[22] Filed: Aug. 23, 1993

[51] Int. Cl.⁶ .......................... B32B 23/02; B32B 27/38; B32B 27/00; B32B 15/04
[52] U.S. Cl. .......................... 428/141; 428/143; 428/192; 428/414; 428/416; 428/423.1; 428/425.3; 428/457; 428/460
[58] Field of Search .................. 428/142, 141, 428/457, 458, 913, 192, 332, 414, 416, 423.1, 143, 460, 425.3; 430/253; 250/318

[56] References Cited

U.S. PATENT DOCUMENTS

| | | | |
|---|---|---|---|
| 3,671,236 | 6/1972 | Van Beusekom | 96/15 |
| 4,053,313 | 10/1977 | Fan | 96/36 |
| 4,364,892 | 12/1982 | Rehlen et al. | 264/284 |
| 4,376,158 | 3/1983 | Spechler | 430/291 |
| 4,376,159 | 3/1983 | Spechler | 430/293 |
| 4,656,114 | 4/1987 | Cederberg et al. | 430/160 |
| 4,659,927 | 4/1987 | Tago et al. | 250/318 |
| 4,666,817 | 5/1987 | Sachi | 430/160 |
| 4,997,507 | 3/1991 | Meyer | 156/286 |
| 5,059,996 | 10/1991 | Bailey et al. | 354/317 |
| 5,075,722 | 12/1991 | Adolphson et al. | 355/77 |

FOREIGN PATENT DOCUMENTS 2144867  3/1985  United Kingdom .

OTHER PUBLICATIONS

P. Nylen and E. Sunderland, *Modern Surface Coatings,* John Wiley & Sons, London, 1965, Chapt. 16, pp. 611–632.
U.S. patent Ser. No. 07/612,975 filed Nov. 15, 1990.

*Primary Examiner*—Paul Thibodeau
*Assistant Examiner*—Stephen Sand
*Attorney, Agent, or Firm*—Thomas H. Magee

[57] ABSTRACT

A carrier plate for use in a lamination process in the preparation of a multicolor proof. The carrier plate comprises a metal support and a flap member mounted to a front edge of the support.

5 Claims, 4 Drawing Sheets

5,563,234

CARRIER PLATE FOR A LAMINATION PROCESS

BACKGROUND OF THE INVENTION

1. Field of the Invention.

This invention relates to a carrier plate for use in a lamination process in the preparation of a multicolor proof.

2. Description of Related Art.

Reproduction of color images through printing is an involved process requiring a breakdown of an original image into a number of fundamental single color images and the eventual recombination of the single color images through multiple printings into a full color reproduction of the original. Color image reproduction typically includes the following steps.

First, using filtering and other photographic techniques a number of color separation transparencies or color separations are produced, typically four, each bearing a halftone dot and/or a continuous tone (contone) image corresponding, for instance, to magenta, cyan, yellow and black portions of the original. Second, a printing plate is made for each color separation by exposing a sensitized plate through one of the transparencies and developing the plate. Third, the printing plates are mounted on a multistage printing press which prints inks on a substrate, typically paper, sequentially and in register, one on top of another, four halftone and/or contone images corresponding to each of the color separations to create a full color reproduction of the original.

In the case of halftone images, the various colors are reproduced by the superposition of a multiplicity of dots of varying diameters and colors corresponding to the four color separations. Any deviation in the size or position of the printed dots results in color shifts in the final printed image. As a result of this reproduction process, setting up the press and printing a four color image is economically feasible typically only when employed for printing large quantities of a given original.

It is desirable to be able to predict the final image appearance before it is printed, and preferably before making printing plates by reviewing images made directly from the color separation transparencies. The art of evaluating the color separation transparencies and deciding whether the various colors have indeed been properly separated is called proofing. Proofing is a process which uses the color separations to create a colored image called a proof to visualize what the final printed image will look like typically without actually making printing plates and running the printing press. Proofing through the creation of proofs shows the printer and customer what the job will look like after printing, so changes can be made, if necessary, to the color separations before the job goes to press where it can waste expensive press time, paper and ink if it is not right. Proofs are used for many purposes including for customer approval, for checking compatibility of a number of subjects to be printed on the same plate or job, for internal quality checking and control, and for relatively small numbers of final reproductions.

For many years the only way to make proofs was to print them on a press. This involved making plates, mounting them on the press, making the press ready to run, and running a few prints. Proofs of this type are very expensive because they involve labor intensive operations and the use of expensive materials (e.g., plates) and cost intensive equipment (e.g., the press). Special proof presses have been built to eliminate the high costs of using production presses, but manpower costs are still high and special proof presses do not always reproduce the printing and visual characteristics of the production press. Furthermore, press proofing by either of these techniques takes a long time to make proofs.

Because of the time and expense to make press proofs attempts have been made to develop and use less expensive and faster alternatives to press proofs. These are usually made by photochemical or photomechanical means and are referred to as off-press, pre-press or pre-plate proofs.

Photochemical or photomechanical proofing systems typically use photosensitive elements in making proofs. These systems generally make proofs by exposing photosensitive elements to actinic radiation through one of the image bearing color separation transparencies to produce a duplicate image that is either a positive or a negative of the transparency depending on the element used. The radiation may make soluble areas insoluble, insoluble areas soluble, tacky areas non tacky, or non tacky areas tacky depending on the element used. After imagewise exposure, the photosensitive element can be developed by washing out soluble areas. Then tacky areas of the element may have to be toned with a dry or liquid colorant. This process is repeated for all color separations. Then the processed elements are laminated together one at a time sometimes on a support or substrate. Protective layers may be peeled apart and removed from the elements before they are laminated to the support or other image elements. Finally, the four color images may be transferred from the support to a receptor, transfer or display sheet, such as a sheet of paper, to form the final proof.

Many photosensitive elements used for image reproduction have the disadvantage that they must be washed out by an organic solvent or aqueous base. For instance, U.S. Pat. No. 4,053,313 to Fan discloses a photosensitive element comprising a solvent-processable photosensitive layer, a tonable elastomeric layer and a support, that is processed (i.e., washed-out) by a mixture of water and organic solvent. The elements disclosed in U.S. Pat. No. 4,376,158 and 4,376,159 to Speckler require aqueous base for washout. Precolored diazo based photosensitive elements which are developed in a mixture of 1-propanol and water are disclosed, for example, in U.S. Pat. No. 3,671,236 to Van Beusekom, U.S. Pat. No. 4,656,114 to Cederburg and U.S. Pat. No. 4,666,817 to Sachi. Use of organic solvents or aqueous bases frequently is undesirable due to flammability, toxicity, corrosion and/or waste disposal considerations. The photosensitive elements disclosed in these Fan and Speckler Patents also require the developed (i.e., washed-out) elements to be toned either manually or in a toning apparatus.

Photosensitive elements are known and are being developed that do not have the above described disadvantages. Specifically, U.K. Patent publication GB 2144867 B discloses photosensitive elements having entirely aqueously developable precolored layers containing a colorant on a removable support. The U.K. Patent further describes a photomechanical process for forming a multicolor image, suitable for use as an off-press proof utilizing the aqueously developable photosensitive elements. The process for preparing a multicolor image is accomplished by (1) imagewise exposure of a first one of the precolored photosensitive elements comprising an aqueously developable precolored photosensitive layer on a removable support through a first one of the color separation transparencies forming image areas and non-image areas in its aqueously developable precolored layer, (2) processing the exposed element to develop the color image by washing away the non-image areas with water, (3) laminating the image bearing element to a substrate, and then (4) peeling the removable support from the image bearing element. A second color image element is made by exposing a second precolored photosensitive element with a second one of the color separation transparencies, processing to develop the color image, laminating in register the second color image element to the first color image element on the substrate and peeling the removable support from the second color image element. By repeating the exposing, processing, laminating in register, and peeling steps two more times, a four color image can be obtained. As long as the emulsion layer of the color separation contacts the photosensitive layer in the photosensitive element during the exposure step as is preferred, the process described in this U.K. Patent results in a wrong reading proof on the substrate. This means that the image on the substrate is a mirror image of that captured in the color separations.

Often it is desirable to view the multicolored image on a receptor or a transfer sheet, such as paper, which is the same as or similar to that which will be used in the final printing run. In this case, the multicolor image is transferred to the desired receptor by laminating and then peeling away the substrate. This results in a right reading proof assuming the emulsion layer of the color separation contacts the photosensitive layer in the photosensitive element during the exposure step. A right reading proof is the same as the original image, not a mirror image.

Many apparatuses have been developed for laminating photosensitive elements. Different laminating apparatuses are designed and used for laminating different photosensitive elements. However, aqueously developable precolored photosensitive elements are a relatively recent development. As such, few apparatuses exist for use in laminating aqueously developed precolored photosensitive elements or image sheets to supports or receiving substrates.

U.S. Pat. No. 4,659,927 to Tago et al. assigned to Fuji Photo Film Co., Ltd., discloses a support plate, a laminator, and a method utilizing the laminator for preparing a multicolor proof. The support plate is described as a thin plate of about 0.5 mm thickness, with good thermal conductivity and rigidity. The material suggested for the support plate is aluminum. The surface of the support plate is provided with a white layer of anodized aluminum for allowing positional adjustment of image elements. The support plate includes a cover sheet. The cover sheet is preferably made of plastics such as polyethylene terephthalate, but is not restricted to plastics and can include a thin metal sheet. The surface of the cover sheet may be coated with silicone or a fluorine-containing resin to prevent adhesion of the cover sheet to an image sheet. An assembly for transfer in the laminator is, in order, the support plate, the image-receiving sheet, the image sheet, and the cover sheet. The cover sheet presses the image sheet and the image-receiving sheet down against the support plate. Since the support plate is rigid, the assembly is prevented from deformation when pressed by heating rollers, and the image sheet and the image receiving sheet are prevented from positional displacement.

A support plate, commercially available from Fuji Photo Film Co., Ltd., is used for laminating aqueously developed precolored photosensitive elements to receiving substrates. Referring to FIGS. 1A and 1B, the support plate 100 of the prior art includes the parts described in the aforedescribed Fuji Patent. The support plate 100 is an aluminum metal support 101, 0.020 in [0.51 mm] thick, having a top side 102 and a bottom side 104. The top side 102 has a first layer 106 of titanium dioxide on the plate 100 and a second layer 108 of a clear polyurethane on the first layer 106. The cover sheet 110 resides on the top side 102 and is hingedly mounted with tape 111 to a front edge 112 of the support plate 100. The bottom side 104 of the support plate 100 has a third layer 114 of clear epoxy.

A particular problem of the laminate-in-register process is in laminating a processed image carrying film to the receiving substrate without causing any image distortion. The image distortion is observed when the dots of the subsequent color image carrying film laminations do not lay in proper position to a previous color image layer's dot. The dimensional error due to the misalignment or mis-registration of each color image layer's dot is referred to as registration error. Registration error becomes noticeable as a color shift when dots are mis-registered by more than half the diameter of a dot. In commercial 200 line per inch printing this maximum registration error translates to 63 microns.

A contributor to registration error can be from the dimensional instability of the polyester base used in each of the color image element and the receiving substrate. Inherently polyester base changes dimensions, i.e., expands, when heated but eventually returns close to its original dimensions when returned to room temperature. The thermal expansion properties of a base are governed by the thermal history that the base underwent during its manufacture. If the thermal histories of the polyester bases for the image carrying elements and the receiving substrate are different, the bases will expand differently upon heating during lamination.

The dimensional instability of the bases complicates registration of the image since, during lamination, the color image of the color image element transfers from the element to the receiving substrate. The color image in the image element resides on the expanding base and expands along with the base. The receiving substrate has an adhesive polymer which expands with the base of the substrate. During the elevated temperature condition of lamination, while both the substrate and the element are expanded, but to different degrees, the image layer is transferred to the receiving substrate. When the element and the substrate cool to room temperature, the image layer cools down while adhered to the base of the substrate. Thus, the position of the dots of the color image, i.e., registration, is influenced by the dimensional changes that occurs for each base. Since the color image transfer process repeats itself 4 times, the final four color image can be grossly out of registration.

It is recognized that the differences in dimensional stability of the bases for the color image element and the receiving substrate can be compensated for by using bases with the same thermal history for the element and substrate, or by using isotropic base. But these alternatives may not be economically or operationally feasible. The difference in dimensional stability of the bases could also be compensated for by a lower lamination temperature, i.e., lower thermal energy applied during lamination. In this case however, the color image typically will not adhere sufficiently to the receiving substrate after lamination.

A need exists to laminate a color image element to a receiving substrate with improved registration of resulting proofs. Particularly, this need exists in off-press apparatus for laminating aqueously developed precolored photosensitive elements or image sheets to supports or receiving substrates using a carrier plate in the process.

SUMMARY OF THE INVENTION

In accordance with this invention there is provided a carrier plate for supporting an image element on a receiving substrate throughout a laminating process using heated lamination rollers, wherein the receiving substrate includes a base with a different thermal expansion characteristic than a base of the image element, the carrier plate comprising:

a metal support having a heat conduction of about 850 to 1400 BTU-in/hr-ft$^2$-°F., the support having a front edge, a top side and a bottom side;

a first sizing layer on the top side;

a second sizing layer on the bottom side;

a third protective layer on the first layer;

a fourth protective layer on the second layer; and a flap member mounted to the front edge of the support, whereby the plate insulates the base of either the receiving substrate or the image element from the heated rollers to provide a 2 to 5° C. lower temperature for the base having the higher thermal expansion characteristic.

BRIEF DESCRIPTION OF THE DRAWINGS

The invention can be more fully understood from the following detailed description thereof in connection with the accompanying drawing described as follows.

DESCRIPTION OF THE PREFERRED EMBODIMENT(S)

In the present situation, the thermal histories of the polyester base for the image carrying element and the base for the receiving substrate are different. Thus the bases have different thermal expansion characteristics and will expand differently upon heating during lamination. For example, the thermal expansion for the receiving substrate can be about 30 micron/meter-°C. and for the color image element can be 18 micron/meter-°C. In particular, for this example, the base of the receiving film will elongate more than the base of the color image element when the thermal energy applied to the substrate and element is substantially the same.

In the present invention, differences in the thermal expansion properties of the bases for the color image element and the receiving substrate are compensated for by laminating in such a way that the thermal energy applied during lamination is different for each of the bases. In the above example, the thermal energy applied to the base of the receiving substrate should be less than the thermal energy applied to the base of the color image element, so that the base of the receiving substrate will expand substantially the same as the base of the color image element.

Figure 1A:
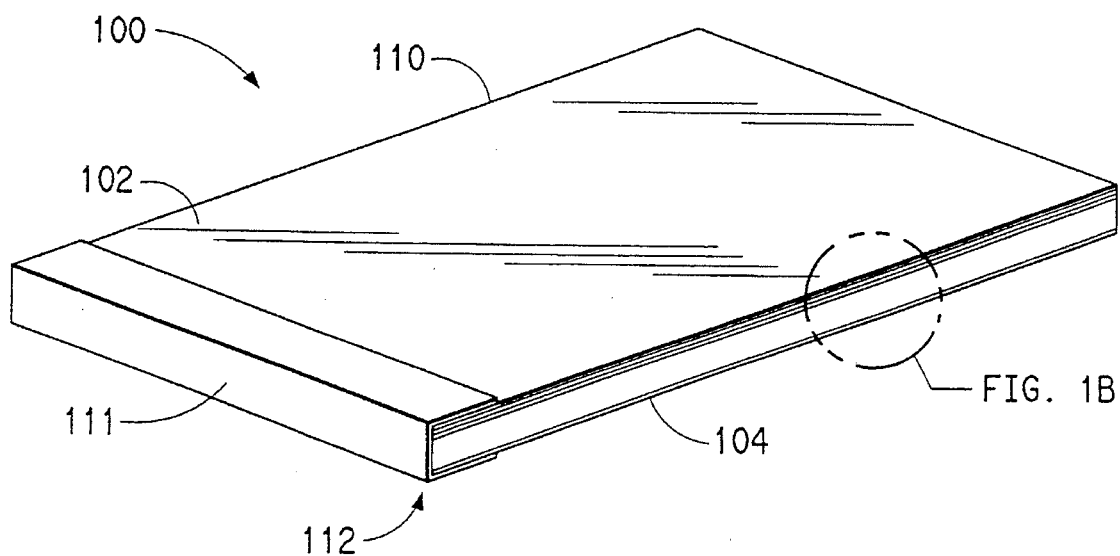
FIG. 1A is a perspective view of a carrier plate of the prior art showing a side view of the plate in detail.
Figure 1B:
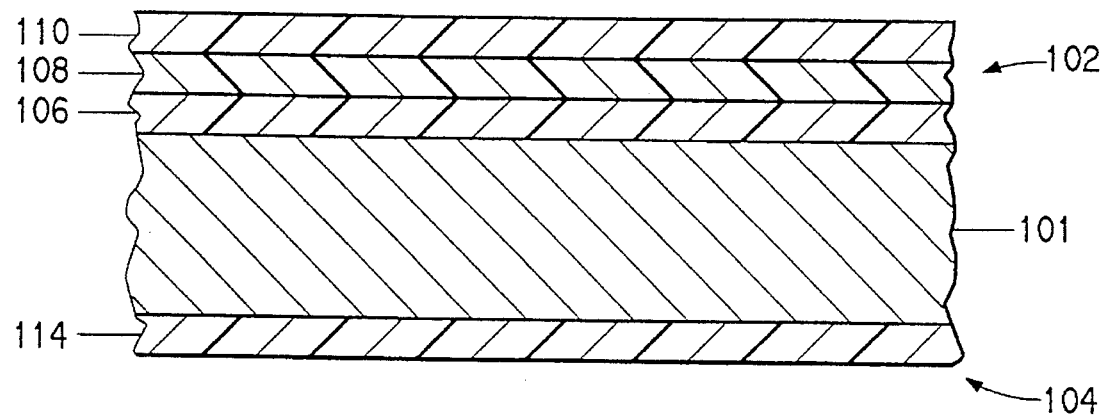
FIG. 1B is a cross section through part of the carrier plate of FIG. 1A.
Figure 2B:
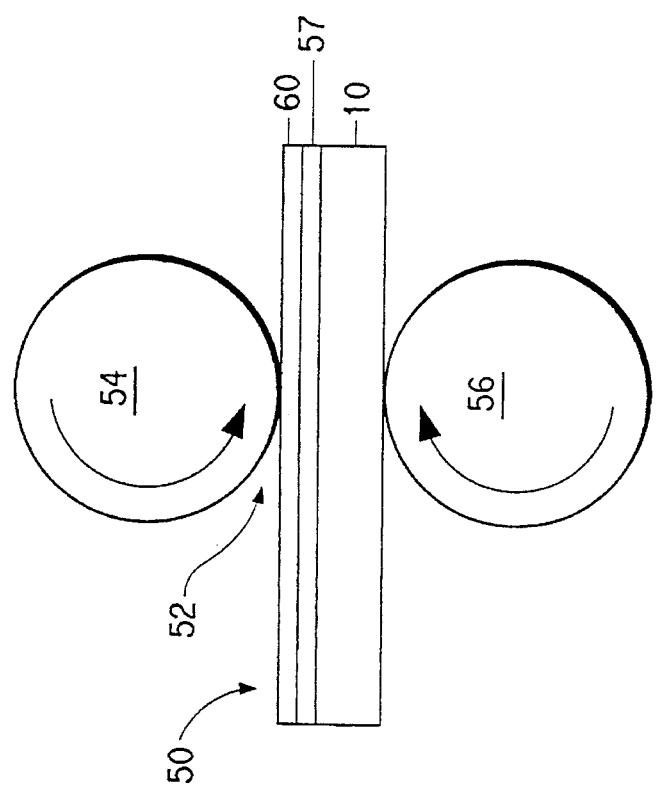
FIG. 2B is a schematic view of the color image bearing film and the receiving substrate on the carrier plate of FIG. 2A passing between lamination rollers of a lamination apparatus for a first color image transfer by lamination.
Figure 2A:
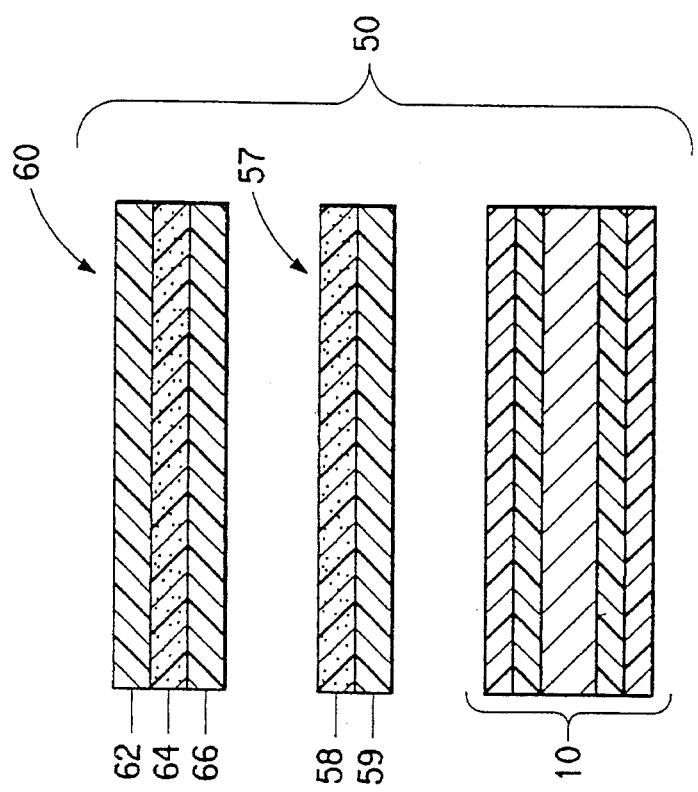
FIG. 2A is a schematic cross-sectional view of a color image bearing film, a receiving substrate and a carrier plate of the present invention with parts exploded from one another.

Referring to FIG. 2B, a first lamination stack 50 for a first color image transfer to a receiving substrate is shown passing through a nip 52 between an upper lamination roller 54 and a lower lamination roller 56. Referring to FIG. 2A, the lamination stack 50 comprises in order, a carrier plate 10 of the present invention, a receiving substrate 57, and a first color image element 60 positioned on the substrate 57. The receiving substrate 57 comprises a polymeric layer 58 on a polyester film base 59. A preferred receiving substrate is Waterproof™ HSR intermediate support sheet. The first color image element 60 comprises a polyester film base 62 having an adhesive layer 64 and a first color image 66 on the adhesive layer 64 opposite the base 62. Preferred color image elements are WaterProof™ proofing films in colors yellow, magenta, cyan, and black.

Figure 2D:
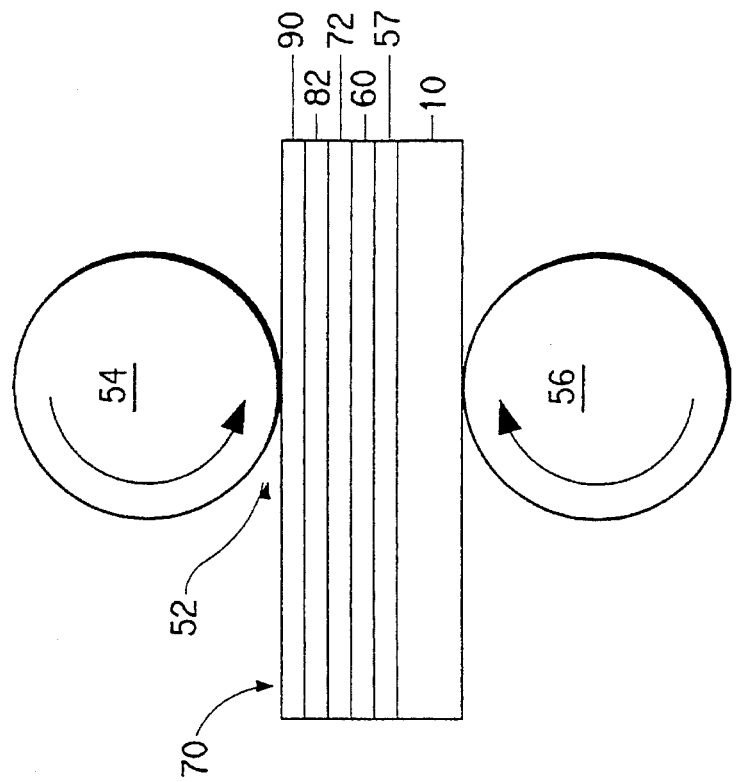
FIG. 2D is a schematic view of the color image bearing film and the receiving substrate on the carrier plate of FIG. 2C passing between the lamination rollers of the lamination apparatus for a fourth color image transfer by lamination.
Figure 2C:
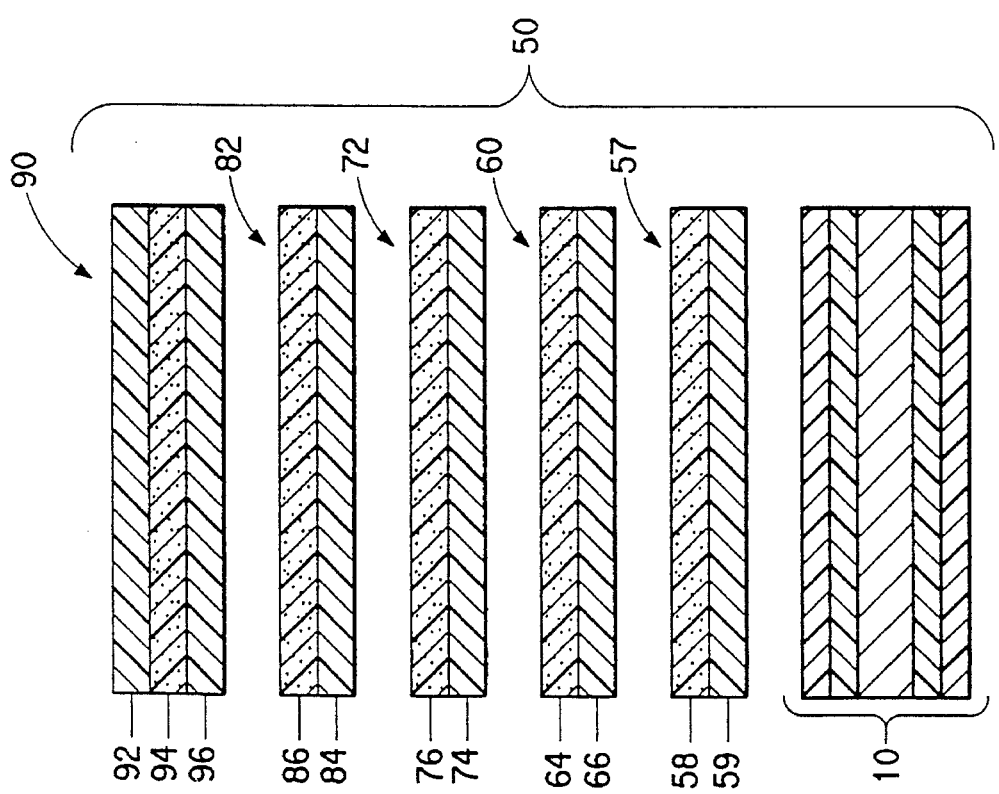
FIG. 2C is a schematic cross-sectional view of a color image bearing film, a receiving substrate and the carrier plate of the present invention with parts exploded from one another.

In FIG. 2D, a fourth lamination stack 70 for a fourth color image transfer to the receiving substrate 57 is passing through the nip 52 of the upper lamination roller 54 and the lower lamination roller 56. The lamination stack 70 comprises in order, the carrier plate 10, the receiving substrate 57, and the fourth color image element 90 positioned in registration with the prior transferred images on the substrate 57. The receiving substrate 57 has undergone lamination of the first color image element 60, a second color image element 72 and a third color image element 82 as previously described by U.K. Patent Publication GB2144867 B, so that the receiving substrate 57 has the first color image 66 and the first adhesive layer 64; a second color image 74 and a second adhesive layer 76; and the third color image 84 and the third adhesive layer 86. Similarly, the fourth color image element 90 comprises a polyester film base 92, having a fourth adhesive layer 94 and a fourth color image 96 on the adhesive layer 94 opposite the base 92. During all four color image laminations, the base 59 of the receiving substrate 57 contacts the carrier plate 10, and the base of the color image element being transferred contacts the upper lamination roller 54. In FIGS. 2A and 2C, the adhesive layers and image layers of the image elements and the receiving substrate are exaggerated for clarity.

The carrier plate 10 insulates the base 59 of the receiving substrate 57 to experience a lower applied thermal energy during lamination. The carrier plate 10 insulates the base 59 of the receiving substrate 57 from the heated lamination roller 56 to provide a 2° C. to 5° C. lower temperature for the base 59 of the receiving substrate 57 than the base of the image element contacted by the heated upper roller 54. By maintaining during lamination a 2° to 5° C. lower temperature of the base 59 of the receiving substrate 57 than that of the base of the image element contacted by the heated upper roller 54, the base 59 of the receiving substrate 57 will expand substantially the same as the base of the color image element contacted by the heated upper roller 54. Since the carrier plate 10 is between the base 59 of the substrate 57 and the lower lamination roller 56, the carrier plate 10 insulates the base 59 of the substrate 57 from the heat applied by the lower lamination roller 56.. The base of the image element which contacts the upper lamination roller 54 experiences the full thermal energy applied by the upper roller 54.

It should be understood that in the case in which the thermal expansion characteristic of the base of the image element is higher than that of the base 59 of the receiving substrate 57, the order of the lamination stack may be reversed. That is, the color image element may be adjacent to the carrier plate 10 with the receiving substrate 57 positioned on top of the color image element, so that the carrier plate 10 will insulate the base of the image element from the thermal energy applied during lamination.

Figure 3A:
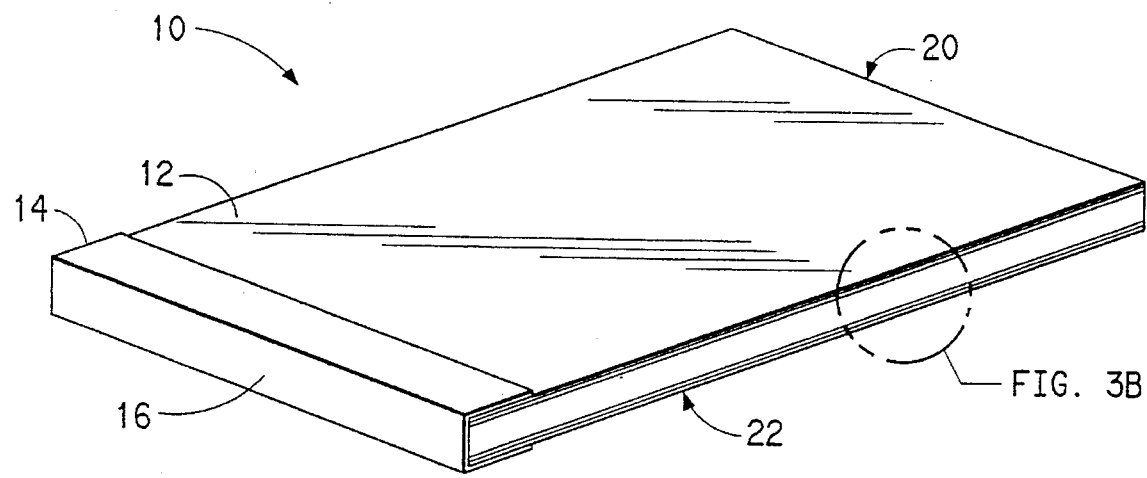
FIG. 3A is a perspective view of the carrier plate of the present invention.
Figure 3B:
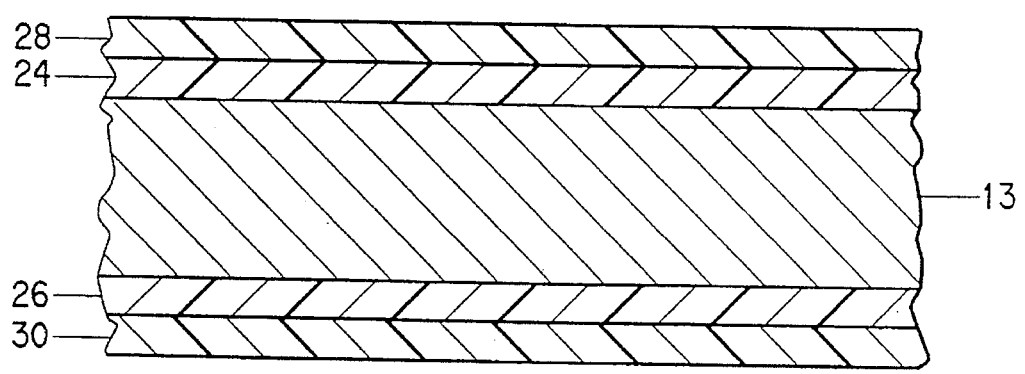
FIG. 3B is a cross section through part of the carrier plate of FIG. 3A.

Referring to FIGS. 3A and 3B, the carrier plate 10 of the present invention includes a support plate 12 and a flap member 14. The support plate 12 is a substantially rigid member which supports the receiving substrate 57 and the color image element(s) during lamination. Although the support plate 12 insulates the base 59 of the receiving substrate 57 during lamination, the temperature difference between the bases (i.e., the base 59 of the substrate 57 and the base of the element contacted by the upper roller 54) is small enough that the support plate 12 is actually a poor insulator. The support plate 12 is a support sheet 13 of a poor insulation material, preferably aluminum or aluminum alloys which have thermal conductivity in the range of 850 to 1400 BTU-in/hr-ft$^2$-°F. A most preferred support plate 12 is made of aluminum type 5052, 0.020 inches thick, and having thermal conductivity of about 960 BTU-in/hr-ft$_2$-°F.

The flap member 14 is hingedly attached to a front edge of the support plate with heat resistive tape 16, such as for example, plastic (Kapton®) film tape, type 5413, sold by 3M, Minnesota. Materials suitable for use as a flap member 14 include plastics, thin sheet metals or metal alloys. The flap member 14 may be coated with silicone or a fluorine-containing resin to prevent adhesion of the flap member 14 to the color image element. A preferred material for the flap member 14 is polyethylene terephthalate with a silicone coating. The flap member 14 when in place on the support plate 12, covers only leading ends of the color image element and the receiving substrate to prevent the leading ends from wrapping around the lamination nip rollers during lamination.

The support plate 12 has a top side 20 and a bottom side 22. The support plate 12 has protective layers applied to the top side 20 and the bottom side 22 in order to withstand the slight abrasive nature of lamination nip rollers which can cause anodizing of the aluminum sheet 13 forming an oxide layer on the support sheet 13. Non-coated or exposed portions of bare aluminum are undesirable for the support plate 12 since aluminum oxide will transfer to the lamination rollers 54, 56, ultimately contacting the receiving substrate 57 and the color image element, and causing defects in the proof.

The top side 20 of the support plate 12 has a first layer 24 which is sizing layer. Similarly, the bottom side 22 of the support plate has 12 a second layer 26 which is a sizing layer. The first layer 24 and the second layer 26 promote adhesion of subsequent layers to the support sheet 13. A preferred sizing material is epoxy resin. The thickness of each of the sizing layers 24, 26 is sufficiently thick to assure adherence of the subsequent layer to the sheet 13. Preferably, the thickness of the first layer 24 and the second layer 26 is about 0.000025 to 0.00015 in, and most preferably 0.00009 in.

A third layer 28 is applied to the first layer 24 on the top side 20 of the support plate 12. A polyurethane resin is a preferred material for the third layer 28. The thickness of the third layer 28 is about 0.0004 to 0.0013 in, and preferably 0.0008 in thick. Included with the material for the third layer is a white pigment. A preferred white pigment is titanium dioxide. The white pigment provides a background surface on the plate to aid in the visual alignment, i.e., registration, of the imaged films prior to lamination.

A fourth layer 30 is applied to the second layer 26 on the bottom side 22 of the support plate 12. It is preferred that the fourth layer 30 is a polyurethane resin material. The thickness of the fourth layer 30 is between about 0.0003 to 0.013 in, preferably 0.0008 in.

The polyurethane resin used for the third layer 28 and the fourth layer 30 provides the both the top side 20 and the bottom side 22 of the carrier plate 10 with a scratch hardness of at least about a 5H pencil. Scratch hardness is determined by the American Society for Testing and Materials (ASTM) standard test method D 3363-74 for film hardness by pencil test, which is hereby incorporated by reference. Protective layers with the scratch hardness of at least about 5H pencil will sufficiently protect the carrier plate against the slight abrasive nature of the lamination nip rollers 54, 56 over multiple passes through the rollers.

Since the color image element and the receiving substrate 57 reside and are supported on the top side 20 of the carrier plate 10 during lamination, surface characteristics of the top side 20 can influence the image quality and system performance. The top side surface should be smooth enough not to impart any small surface anomalies into the substrate 57 or element during lamination and should be rough enough to allow air between the substrate 57 and the plate 10 to bleed out during lamination and to bleed in after lamination. Bleeding in of air after lamination permits easy removal of the lamination stack from the carrier plate 10. It is preferred that the surface roughness of the top side surface of the carrier plate 10 is about 8 to about 18 μms for suitable results.

The surface roughness of the carrier plate 10 can be attained by various methods of applying the protective layers to the support plate 10. Many methods of applying the protective layers to the support plate 10 can be used, such as, for example, dip coating, roll coating, silk screen coating, and curtain coating which are well known to one skilled in the art. Methods for applying coating layers onto a metal surface are described in *Modern Surface Coatings*, by P. Nylen and E. Sunderland, John Wiley & Sons, London, 1965, Chapter 16, pages 611–632, which is hereby incorporated by reference. A preferred method of coating the first sizing layer 24 on the support sheet 13 is by roll coating. In roll coating, a roller applies a solution as a layer to the support sheet either manually or with specialized roller machines. A preferred method of coating the third layer 28 onto the first layer 24 is by silk screen coating. In silk screen coating, a metal sheet is placed horizontally and covered with a frame holding a fine mesh screen of textile or wire. Paint is applied by a roller or a squeegee and is forced through the open mesh of the screen onto the sheet beneath. The combination of roll coating the first layer 24 and silk screen coating the third layer 28 provides a surface roughness within the desired range of about 8 to 18 μms. It should be understood that since the bottom side surface of the carrier plate 10 does not contact the lamination stack during lamination, it is not critical which coating method is used to apply the second layer 26 and the fourth layer 30 to the bottom side of the carrier plate 10. For ease of manufacturability, the second layer 26 may be applied by roll coating and the fourth layer 30 may be applied by silk screen coating.

Any lamination apparatus capable of applying suitable pressure and temperature to transfer a color imaged film to a support film or paper is suitable for use with the carrier plate 10 of the present invention. A particularly preferred lamination apparatus is a WaterProof™ laminator (sold by DuPont, Wilmington, DE) as described in U.S. Pat. No. 5,236,542. Preferred laminator conditions for transfer of a color film to an intermediate support sheet are 100° C. for the top roller and the bottom roller, 5.35 lbs per lineal inch pressure, and 400 mm/min. transport speed. Preferred laminator conditions for transfer of the color image on the intermediate support sheet to the permanent support are 100° C. for the top roller and bottom roller, 16 lbs per linear inch pressure, and 400 mm/min. transport speed.

The lamination temperature, pressure of the laminator roller assemblies, and the transport speed are interrelated. It should be understood that if the temperature of the lamination rollers was other than preferred, the lamination pressure and the transport speed would be appropriately changed to compensate so that the base of the receiving substrate experiences 2 to 5° C. lower temperature than the base of the color image element during lamination. This enables the laminator to operate at other than the preferred conditions while still accomplishing substantially equivalent applied thermal energy to the lamination stack, and enables the carrier plate to insulate the base of the element or substrate having the higher thermal expansion characteristic.

EXAMPLES

Unless otherwise indicated the following materials, equipment and test method were used in the examples. Materials used were:

WaterProof™ proofing films in colors yellow, magenta, cyan, and black;

Waterproof™ HSR intermediate support sheet as a receiving substrate; and

Press paper permanent paper support, (100 weight text paper).

EQUIPMENT

Lamination occurred in a WaterProof™ laminator, as described in U.S. Pat. Ser. No. 07/612,975. Laminator conditions for transfer of a color film to an intermediate support sheet (condition 'A') were: 100° C. for the top roller and the bottom roller, 5.35 lbs per lineal inch pressure, and 400 mm/min. transport speed. Laminator conditions for transfer of the color image on the intermediate support sheet to the permanent support (condition 'B') were: 100° C. for the top roller and bottom roller, 16 lbs per lineal inch pressure, and 400 mm/min. transport speed.

Color films were processed in a WaterProof™ processor, as described in U.S. Pat. No. 5,059,996, to develop the imaged areas by washout of the non-imaged areas. Processor conditions were 9 mm brush footprint, 109 rpm brush speed, and 31 in/min transport speed.

The WaterProof™ proofing films, WaterProof™ transfer sheet intermediate support, WaterProof™ laminator, and WaterProof™ processor are commercially available from E. I. du Pont de Nemours and Co., Wilmington, DE.

TEST METHOD

A silver halide negative separation film was used to imagewise expose the color proofing film. Crosshair registration marks were imaged at several locations on the separation film so that the individual color films were registerable to each other. All color films were exposed with the same separation to ensure consistent size of the pre-laminated image. Each color proofing film was exposed to a 5 kW ultraviolet light source, for a time sufficient to achieve 0.5% to 99.5% dots and 6 micro line pattern on a UGRA plate control wedge and resolution scale target. The color films were processed as described above.

EXAMPLES 1 THROUGH 14 AND COMPARATIVE EXAMPLE 1

Examples 1 through 14 and Comparative Example 1 demonstrate the effect of changes in temperature during the lamination process on an image of an image-carrying color film material.

Each of the four color films were exposed and processed as indicated above. The cover sheet on the HSR intermediate support substrate, hereinafter referred to as the substrate, was peeled off to expose the adhesive/polymer layer. The substrate was placed on a support plate and the first color film, yellow, was placed with the color side against the polymer layer of the substrate, creating a sandwich. The sandwich was sent through the laminator using conditions 'A' as described above. The sandwich was cooled, and the base of the first color film was removed, to expose the adhesive layer. The second color film, magenta, was placed color side down on the first image and the leading edge registration marks were aligned between the first color and second color images using 100x magnification lens. The sandwich with the second color film was sent through the laminator as before. The steps of removing the base of the color film, aligning, and laminating were repeated until all four color films were transferred to the substrate. The base on the last color layer was removed after lamination to the substrate. The four color layer sandwich with the substrate was flipped over, i.e., color side down, onto a permanent paper support, and sent through the laminator using conditions 'B' described above. The substrate was removed, and the four color image remained on the permanent paper support. The above described orientation of the color film and the substrate to the support plate is preferred orientation. Examples are included in which the color film and the substrate are flipped in orientation to the support plate, i.e., the color film base is against the support plate and the substrate base is on top of the sandwich.

The temperature of the substrate base and the temperature of the color film base were determined by locating thermocouples in the sandwich, at the leading end, middle and trailing end along a central lane of the sandwich. At each location, i.e., leading, middle and trailing, three thermocouples were placed: one on the top surface of the sandwich, to monitor the temperature of the base of the color film; the second between the color film image layer and the polymer layer of the support; and the third between the substrate and the support plate, to monitor the temperature of the base of the support. The thermocouples were connected to a Keithley A/D converter, model series 500, (Keithley Inc., Cleveland, OH), and the signals sent to a Compaq Portable II desktop computer using Labtech Notebook software program, version 6.0 (sold by Laboratory Technologies Corp., Wilmington, VA). The temperature profile of each of the thermocouples was monitored as the sandwich transported through the laminator. The delta (Δ) temperature reported is the temperature of the base of the color film minus the temperature of the base of the support.

The registration error was determined by measuring the total width of a registration line on the registration mark on the four color image and subtracting the known line width of the silver halide target. The total width of the registration line is the distance between the two outermost edges of the registration line, regardless of color. Ideally, the registration line for all four colors should be directly on top of each other, i.e., completely registered, and therefore the difference between the total width of the registration line and the known value should be zero. Measurement was done under 100x magnification.

Unless otherwise noted, the support plates used did not have any coatings on them. (It was assumed that the presence or absence of coatings on the plate would not substantially affect the thermal conditions experienced by the plate.)

| Support Plate | Description | Sandwich Orientation |
|---|---|---|
| A | cardboard | Color film on top |
| B | 0.020 in steel | " |
| C | 0.010 in steel | " |
| D | 0.020 in aluminum (7178) | " |
| E | 0.020 in aluminum (2024) | " |
| F | 0.020 in aluminum (5052) | " |
| G | 0.010 in aluminum (2024) | " |
| H | cardboard | Substrate on top |
| I | 0.020 in steel | " |
| J | 0.010 in steel | " |
| K | 0.020 in aluminum (7178) | " |
| L | 0.020 in aluminum (2024) | " |
| M | 0.020 in aluminum (5052) | " |
| N | Invention- carrier plate with all layers | Color film on top |
| O | ColorArt guide plate assembly model 363F1605, sold by Fuji. | " |

| | | Results | | |
|---|---|---|---|---|
| Example | Plate Support | Δ Temp. (°C.) | Image Quality | Resolution (μms) |
| 1 | A | +15 | Gross stretch | +300 |
| 2 | B | +10 | Gross stretch | +250 |
| 3 | C | +10 | Stretch | +225 |
| 4 | D | +5 | Good | +25 |
| 5 | E | +2 | Good | +25 |
| 6 | F | +3 | Good | +25 |
| 7 | G | +1 | Slight shrink | −50 |
| 8 | H | −15 | Gross shrink | −400 |
| 9 | I | −10 | Gross shrink | −300 |
| 10 | J | −10 | Gross shrink | −250 |
| 11 | K | −5 | Shrink | −125 |
| 12 | L | −2 | Shrink | −125 |
| 13 | M | −3 | Shrink | −125 |
| 14 | N | +3 | Good | +25 |
| Comp. 1 | O | +5 | Good | +60 |

The results of the examples show how the resolution and image quality of a proof can be affected by the temperature difference experienced by the lamination stack due to the type of support plate used and the order of the image element and receiving substrate relative to the carrier plate.

EXAMPLE 15 AND COMPARATIVE EXAMPLES 2 AND 3

The following examples demonstrate the durability of the bottom surface layer, particularly the fourth layer, on a carrier plate.

The carrier plates tested were: the plate of the present invention, plate N as described in Example 14; the prior art support plate assembly, plate O described in Comparative Example 1; and a clear hardcoat anodized aluminum plate, identified as plate P.

Each plate was passed through the laminator with the films using laminator conditions 'A' as described above. After each pass the bottom side of the carrier plate was evaluated for wear through of the backing protective layer (fourth layer). The number of passes through the lamination rollers were recorded until 1% of the surface area of the backing surface was worn through. The results are summarized in the table below.

| Example | Plate | No. Passes until 1% backing surface area wear through |
|---|---|---|
| 15 | N | 3,000+ |
| Comp. 2 | O | 500 |
| Comp. 3 | P | 10,000+ |

EXAMPLE 16 THROUGH 27

Examples 16–27 demonstrate the effect of the coating application method of one or more layers on a carrier plate on the image-carrying film.

The first layer (sizing) and third layer (polyurethane white pigmented) were applied to a support plate, 0.020 in aluminum, using different coating methods. The coated support plate was then used as a carrier plate in the image transfer process as described above.

The coating methods evaluated were: roll coating, which was a paint roller like application; curtain coating, in which the metal substrate was transported under a cascading curtain of coating solution; silk screen, in which a squeegee blade wiped the coating solution through a fine mesh silk screen onto the metal substrate; and gold chromate (dip) coating, which the metal substrate was dipped in a chemical bath of gold chromate solution. In Examples 25–27, the gold chromate solution replaced the epoxy sizing resin. The surface roughness of the top surface layer contacting the color image element was measured by a profiler sold by Tencor. The four color image was examined through a x magnifying lens and the results are shown in the following table. The number for image evaluation represents the following:

1. surface of the carrier plate was too smooth, image-bearing element stuck to the carrier plate
2. acceptable proof made
3. surface of the carrier plate was too rough, carrier plate surface left impressions in the image bearing element.

| Example | First Layer Coated | Third Layer Coated | Surface Roughness (μms) | Image Evaluation |
|---|---|---|---|---|
| 16 | rolled | rolled | 48–52 | 3 |
| 17 | rolled | curtain | 32–34 | 3 |
| 18 | rolled | silk scr | 10–14 | 2 |
| 19 | curtain | rolled | 46–48 | 3 |
| 20 | curtain | curtain | 42–45 | 3 |
| 21 | curtain | silk scr | 19–25 | 3 |
| 22 | silk scr | rolled | 39–42 | 3 |
| 23 | silk scr | curtain | 38–41 | 3 |
| 24 | silk scr | silk scr | 5–7 | 1 |
| 25 | Gold Chr | rolled | 39–41 | 3 |
| 26 | Gold Chr | curtain | 35–39 | 3 |
| 27 | Gold Chr | silk scr | 14–18 | 2 |

The results of Examples 16 through 27 indicate that the surface roughness of the top side of the carrier plate, as developed by the coating application method of the first layer and the third layer, influenced the performance of the color image-bearing material. A surface roughness of about 8 to about 18 μms of the carrier plate provides acceptable image quality.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A carrier plate for a laminating process using heated lamination rollers, comprising:

a metal support having a heat conduction of about 850 to 1400 BTU-in/hr-ft$_2$-°F., the support having a front edge, a top side and a bottom side;

a first layer being a sizing layer on the top side;

a second layer being a sizing layer on the bottom side;

a third layer being a protective layer on the first layer, the third layer having a scratch hardness of at least about 5H pencil, the first layer promoting adhesion between the metal support and the third layer, the third layer having a surface with a roughness of about 8 to about 18 μms; and a fourth layer being a protective layer on the second layer, the fourth layer having a scratch hardness of at least about 5H pencil, the second layer promoting adhesion between the metal support and the fourth layer, and a flap member mounted to the front edge of the support.

2. The carrier plate of claim 1, wherein the metal support is selected from the group consisting of aluminum and aluminum alloys.

3. The carrier plate of claim 1, wherein the first sizing layer and the second sizing layer are an epoxy resin.

4. The carrier plate of claim 1, wherein the third layer and the fourth layer are a polyurethane resin.

5. The carrier plate of claim 1, wherein the third layer further comprises a white pigment.

* * * * *